United States Patent [19]

Keller et al.

[11] 4,099,426
[45] Jul. 11, 1978

[54] HYDRODYNAMIC TRANSMISSION FOR VEHICLES

[75] Inventors: Rolf Keller; Erich Polzer, both of Heidenheim, Brenz, Fed. Rep. of Germany

[73] Assignee: Voith Getriebe KG, Heidenheim, Brenz, Fed. Rep. of Germany

[21] Appl. No.: 715,981

[22] Filed: Aug. 19, 1976

[30] Foreign Application Priority Data

Aug. 22, 1975 [DE] Fed. Rep. of Germany ....... 2537431

[51] Int. Cl.$^2$ .................. F16H 47/00; F16D 33/00; F16D 67/04; B60K 41/26
[52] U.S. Cl. ........................... 74/730; 60/363; 74/718; 192/4 B
[58] Field of Search ............. 60/363, 352, 355, 357; 74/718, 720, 731, 732, 733, 730; 192/3.34, 4 B

[56] References Cited

U.S. PATENT DOCUMENTS

| | | | |
|---|---|---|---|
| 2,750,009 | 6/1956 | Pohl | 60/357 X |
| 2,805,549 | 9/1957 | Hensleigh et al. | 60/355 |
| 3,159,055 | 12/1964 | Schweizer | 74/731 X |
| 3,270,587 | 9/1966 | Geray | 74/718 X |
| 3,335,568 | 8/1967 | van de Hey | 60/352 |
| 3,383,951 | 5/1968 | Morrow | 74/718 |
| 3,555,931 | 1/1971 | Polzer | 74/718 |
| 3,566,715 | 3/1971 | Keller et al. | 74/732 X |
| 3,677,004 | 7/1972 | Muller et al. | 60/352 |

FOREIGN PATENT DOCUMENTS 824,946   12/1959   United Kingdom ............ 60/363

*Primary Examiner*—Samuel Scott
*Assistant Examiner*—Carl F. Pietruszka
*Attorney, Agent, or Firm*—Peter K. Kontler

[57] ABSTRACT

A transmission for locomotives, earthmoving vehicles or analogous conveyances has two closely adjacent parallel adjustable starting torque converters, one in the forward and the other in the reverse drive train, a common first gear train which connects the primary shafts of the starting converters with each other and with the input shaft, a second gear train which connects the secondary shafts of the starting converters with each other and with the output shaft, a cruising converter which is coaxial with the starting converter of the forward drive train and has a discrete secondary shaft coaxial with the secondary shaft of the respective starting converter and connected with the output shaft by a third gear train, a hydraulic brake whose rotor is driven by the secondary shaft of the starting converter of the reverse drive train and is effective only when the output shaft rotates in the forward direction, a first control unit which engages the brake and causes evacuation of working fluid from the working circuit of the cruising converter when the RPM of the output shaft is excessive, and a second control unit which reduces the transmission of power by the starting converter of the forward gear train when the RPM of the outut shaft exceeds a rated value by 20–40 percent. The brake and the converters are mounted in the casing of the transmission at the four corners of an imaginary square. At least the starting converters have stationary housing, turbine wheels which are designed for centrifugal flow of working fluid therethrough, and annuli of adjustable guide vanes which are designed for centripetal flow of working fluid therethrough.

11 Claims, 3 Drawing Figures

HYDRODYNAMIC TRANSMISSION FOR VEHICLES

BACKGROUND OF THE INVENTION

The present invention relates to hydrodynamic transmissions, especially for use in vehicles, and more particularly to improvements in transmissions of the type having one or more hydrodynamic torque converters in the forward as well as in the reverse drive train. More particularly, the invention relates to improvements in transmissions of the type disclosed in commonly owned U.S. Pat. Nos. 3,566,715 to Keller et al. and 3,677,004 to Muller et al.

Transmissions of the class disclosed in the aforementioned patents are often utilized in locomotives which are intended for shunting or switching service in marshalling yards, in earthmoving vehicles and in similar conveyances which are designed to perform operations involving frequent reversals in the direction of travel. An advantage of such transmissions is that the shifting into different speeds and/or changing the direction of movement does not cause any wear upon the component parts. This is due to the fact that such operations merely involve emptying or filling the working circuits of selected converters.

An earthmoving apparatus, e.g., a scraper, is often operated under circumstances which necessitate repeated back-and-forth movements during loading of the bowl. Such movements are normally performed at low speeds. At the same time, traction force or output torque must be sufficiently high to insure that the scraper is not arrested when the bowl encounters a pronounced resistance to forward movement at a speed in the range of 2 to 4 miles per hour. In addition, the transmission should be capable of insuring rapid movement of the vehicle during long-distance hauling of loads, e.g., when the vehicle is driven on paved roads.

It has been found that heretofore known hydrodynamic transmissions are not entirely satisfactory for use in earthmoving vehicles, especially in scrapers, bulldozers and analogous apparatus, even though the required performance characteristics of a hydrodynamic transmission in a locomotive do not deviate appreciably from those which are expected from a hydrodynamic transmission in a heavy-duty earthmoving apparatus. This is due to the fact that the circumstances under which an earthmoving vehicle is operated are often basically different from those under which a locomotive for switching or shunting is put to use. For example, a very high percentage of the power output of the prime mover in an earthmoving vehicle is used up for operation of auxiliary equipment, especially the hydrostatic pump or pumps of the lifting mechanism for the bowl.

Conventional hydrodynamic transmissions for earthmoving apparatus (e.g., those disclosed in U.S. Pat. No. 3,347,113 to Ramsel) employ a hydrodynamic torque converter and a range transmission. The transmission of Ramsel can furnish converter or straight mechanical drive and can change speeds while under load. However, when shifting into a different gear, or during frequent changes in the direction of movement, the friction clutches of the patented transmission are subjected to extensive wear and the changes in speed take place without gradual transition from higher speed to lower speed or vice versa.

SUMMARY OF THE INVENTION

An object of the invention is to provide a hydrodynamic transmission, especially for use in earthmoving vehicles, which can change speeds without any wear upon its component parts.

Another object of the invention is to provide a transmission of the just outlined character wherein the output torque can be varied without changing the speed of the prime mover, i.e., wherein the prime mover can be operated at a rated speed even when the torque which is transmitted by the output element of the transmission varies within a wide range.

A further object of the invention is to provide a hydrodynamic transmission which is capable of effecting shock-free and gradual changes in speed and/or direction of movement without any wear upon its component parts, whose versatility exceeds that of heretofore known transmissions and which is less sensitive, more rugged and less prone to malfunction than a conventional transmission, especially a conventional hydrodynamic transmission for use in earthmoving vehicles.

The invention is embodied in a transmission, particularly in a transmission for vehicles, which comprises rotary input means, reversible rotary output means, and forward and reverse drive trains each of which includes an adjustable starting fluid flow converter having a working circuit which receives working fluid (e.g., oil) to render the respective converter operative and from which working fluid is evacuated to render the respective converter ineffective. The drive trains further comprise a first mechanical power train (preferably a gear train) which is common to and connects the starting coverters with the input means, and a second mechanical power train (preferably a second gear train) which connects the starting converters with the output means.

In accordance with a presently preferred embodiment of the invention, the starting converters are closely adjacent to each other and have parallel primary and second elements. The gears of the first power train connect the primary elements of the starting converters to each other, and the gears of the second power train connect the secondary elements of the starting converters to each other.

The forward power train preferably further comprises a cruising fluid flow converter which is coaxial with the respective starting converter but has a discrete secondary element which is coaxial with the secondary element of the associated starting converter and is connected with the output means by a third gear train. The reduction gear ratio of the forward drive train in operative condition of the starting converter is preferably two to four times the reduction gear ratio of the forward drive train when the cruising converter of such drive train is operative.

The transmission preferably further comprises a brake, most preferably a hydrodynamic brake, and means for actuating the brake when the RPM of the output means exceeds a preselected value. The brake is preferably coaxial with the starting converter of the reverse drive train and the aforementioned brake actuating means is preferably arranged to initiate the evacuation of working fluid from the working circuit of the cruising converter simultaneously with actuation of the brake when the output means is driven by the cruising converter.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
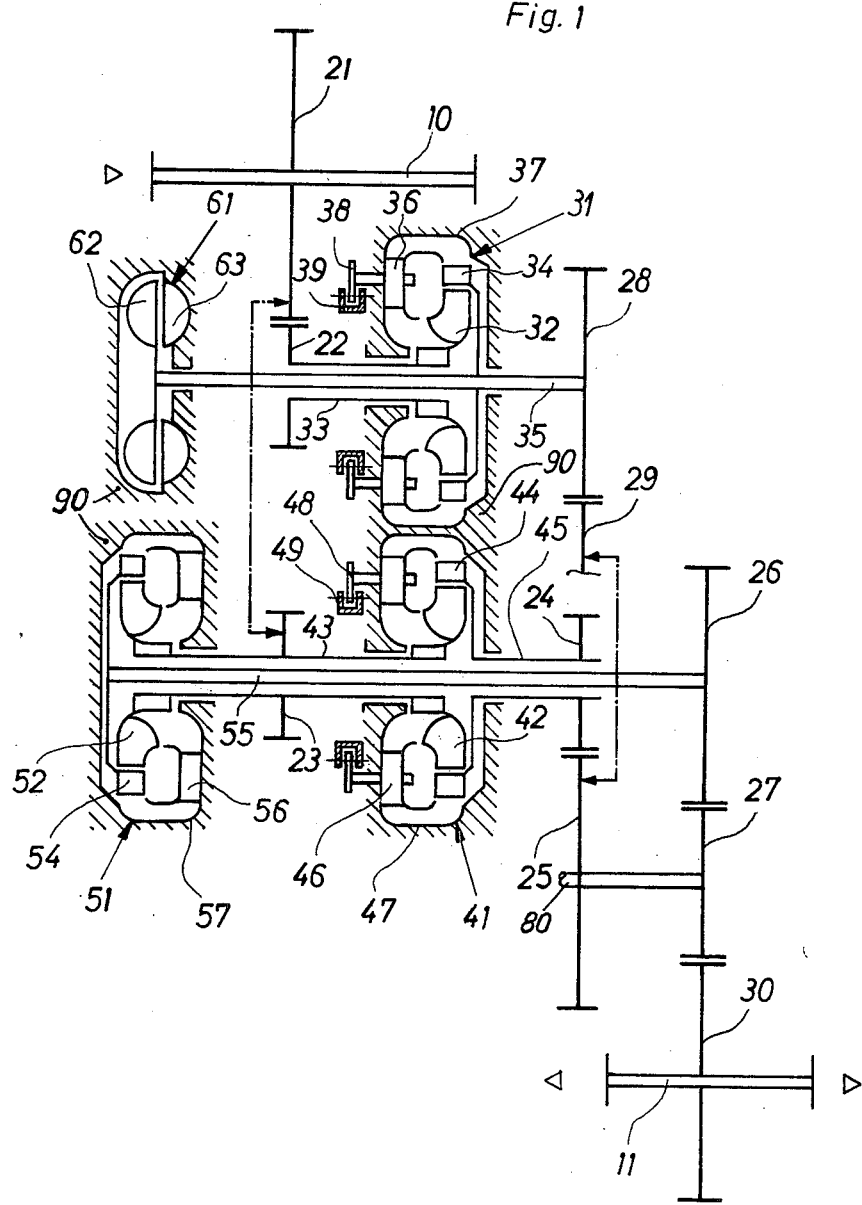
FIG. 1 is a schematic sectional view of a hydrodynamic transmission which embodies the invention, the section being taken along the line I—I of FIG. 2 as seen in the direction of arrows.
Figure 2:
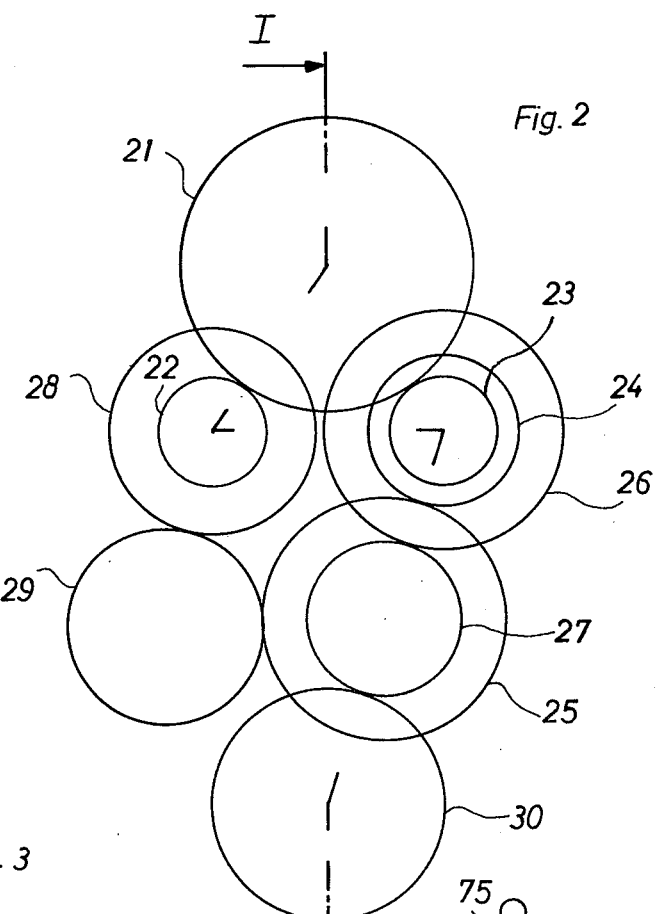
FIG. 2 is a schematic end elevational view of the gear train in the transmission of FIG. 1.

Referring to FIGS. 1 and 2, there is shown a hydrodynamic transmission for vehicles, e.g., for earthmoving vehicles, which comprises a driving shaft or input shaft 10 with a spur gear 21 which meshes with spur gears 22 and 23. The transmission further comprises two starting torque converters 31, 41. The converter 31 establishes reverse drive and the converter 41 establishes forward drive. The converters 31, 41 have two parallel secondary shafts 35, 45 which are closely or immediately adjacent each other. The pump wheels 32, 42 of the converters 31, 41 are respectively connected with the spur gears 22, 23 by primary shafts 33, 43. The train of gears 21-23 constitutes a first power train which connects the primary shafts 33, 43 with each other and with the input shaft 10. The turbine wheel 34 of the converter 31 is connected with a further spur gear 28 by means of the secondary shaft 35, and the turbine wheel 44 of the converter 41 is mounted on the secondary shaft 45 which is hollow and rigid with a spur gear 24. The adjustable guide vanes of the converters 31, 41 are respectively shown at 36, 46, and the stationary housings of these converters are respectively shown at 37 and 47.

The spur gears 28 and 24 at the output sides of the starting converters 31, 41 respectively mesh with spur gears 29, 25 and form therewith a portion of a second gear train or power train which insures that the secondary shafts 35 and 45 invariably rotate in opposite directions.

The starting converter 41 is coaxial with a high-speed or cruising hydrodynamic torque converter 51 having a pump wheel 52, a turbine wheel 54, non-adjustable guide vanes 56 and a stationary housing 57. The primary shaft 43 is common to the converters 41 and 51; however, the cruising converter 51 includes a discrete secondary shaft 55 which is rigid with a spur gear 26. The gear 26 mates with a gear 27 which is connected with the gear 25 by a shaft 80. The gear 27 further meshes with a spur gear 30 on an output shaft 11. The gears 26, 27 constitute a third gear train which connects the secondary shaft 55 with the gear 30 of the second gear train.

FIG. 2 shows that the spur gear 25 meshes with the spur gear 29.

The hydraulic features of the cruising converter 51 may be identical with those of the starting converter 41. The ratio of cruising speed to starting speed is then determined by the gears 24 to 27. By way of example, the speed ratio of shafts 45 and 55 may be 2.7 to 1.

Alternatively, the speed ratio of 2.7 to 1 can be established by resorting to a hydraulic speed ratio of 1.8 to 1 between the converters 51, 41 and a mechanical speed ratio of 1.5 to 1 between the shafts 45 and 55.

The starting converter 31 is coaxial with a hydrodynamic brake 61 whose rotor blades 62 are rigid with the secondary shaft 35 and cooperate with fixed stator blades 63.

As mentioned above, the cruising converter 51 is not adjustable because its guide vanes 56 are fixed. It is assumed here that the energy requirements of the aforementioned hydrostatic pump or pumps (which are used in an earthmoving vehicle) are relatively low when the vehicle is driven at cruising speed. If the energy requirements of the hydrostatic pump or pumps are expected to rise, at least for a short interval of time, while the vehicle is operated at crusing speed, the non-adjustable cruising converter 51 is replaced with an adjustable converter.

The adjustable guide vanes 36, 46 of the converters 31, 41 are respectively connected with links 38, 48. The links 38 and 48 are respectively coupled to adjusting rings 39, 49.

Figure 3:
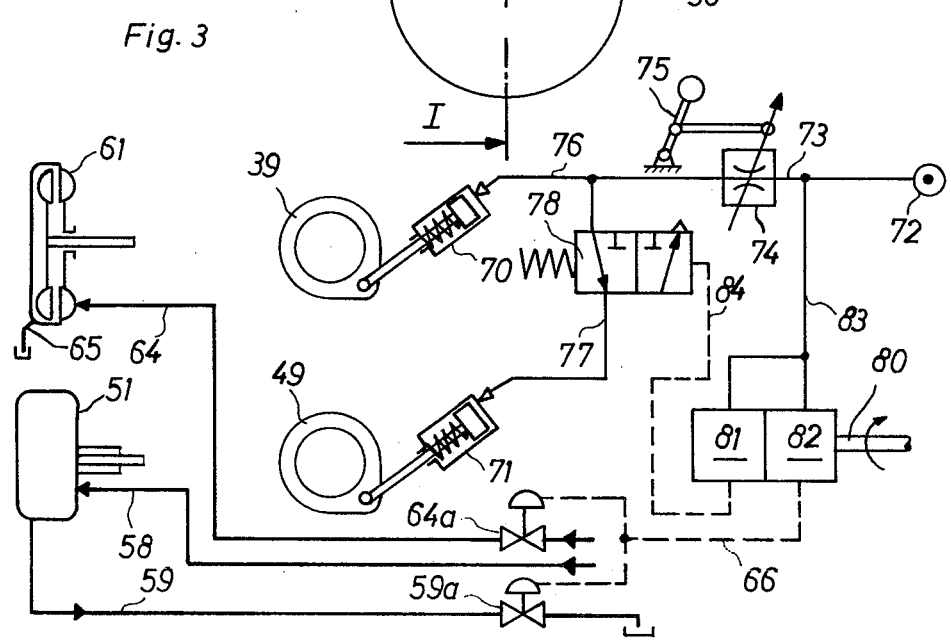
FIG. 3 is a diagrammatic view of a portion of the control system for the transmission of FIG. 1.

Referring to FIG. 3, the adjusting rings 39, 49 are movable by discrete single-acting hydraulic cylinder and piston units 70, 71. The cylinder chambers of the cylinders of units 70, 71 can receive pressurized hydraulic fluid from a source 72 by way of a pressure pipe 73 which contains an adjustable pressure regulating valve 74 with actuating means 75. The latter is a lever which enables the operator to change the pressure of fluid in the pipe 73 with a high degree of accuracy. A conduit 76 connects the outlet of the regulating valve 74 directly with the chamber of the cylinder in the unit 70. A conduit 77 which branches off the conduit 76 is connected to the chamber of the cylinder in the unit 71 and contains a multi-way valve 78.

The shaft 80 of the transmission drives two RPM monitoring devices 81 and 82 which receive pressurized fluid from the pipe 73 via conduits 83. When the speed of shaft 80 exceeds a rated speed that corresponds to a rated portion of the maximum speed of the vehicle (e.g., 20-40 percent), the outlet of the monitoring device 81 admits pressurized fluid to a control line 84 which shifts the valve member of the valve 78 to thereby disconnect the chamber of the cylinder in the unit 71 from the conduit 76. This results in closing of the guide vanes 46 in the converter 41 (i.e., in a reduction of transmission of power by the converter 41) and prevents prolonged slippage of wheels of the vehicle which embodies the transmission. The device 81 and valve 78 constitute a means for adjusting the starting converter 41 in response to an increase of RPM of the shaft 11 beyond a predetermined value.

FIG. 3 further shows certain details of the hydrodynamic brake 61, i.e., a conduit 64 for admission of hydraulic fluid and a fluid evacuating conduit 65. The working circuit of the converter 51 receives fluid by way of a conduit 58 and is further connected with an evacuating conduit 59. The conduits 59 and 64 respectively contain valves 59a, 64a which are opened by fluid admitted by monitoring device 82 via control line 66 when the speed of the vehicle reaches a maximum rated value. This constitutes a safety feature of the improved transmission. The monitoring device 82 can be said to form part of actuating means for the brake 61 and of means for initiating the evacuation of fluid from the working circuit of the converter 51.

It is clear that the transmission further comprises means (not shown) which enables the driver to regulate the admission of fluid into and evacuation of fluid from the working circuits of the starting converters 31 and 41, cruising converter 51 and brake 61. The working circuit(s) of the hydrodynamic system or systems which are not in use are always empty. It is desirable and advantageous to insure that, when the vehicle is operated at a relatively high (cruising) speed, the guide vanes 36, 46 of the starting converters 31, 41 are closed in order to avoid unnecessary losses as a result of circulation of air. Reference may be had to the disclosure of the aforementioned patent to Muller et al.

The illustrated starting converters constitute but one type of adjustable converters which can be utilized in the transmission of the present invention. For example, at least one of the starting converters may comprise a pump wheel with adjustable blades or at least one starting converter may be adjustable in a manner as disclosed and as shown in FIGS. 7 and 8 of the patent to Muller et al. This patent discloses that the converter comprises guide vanes each having a head part and a tail part. The tail parts are affixed to the converter housing and the head parts form a ring which is movable with respect to the tail parts. Furthermore, the torque which is transmitted by the output shaft 11 can be regulated by changing the extent of filling of the working circuit of the active converter. Converters with adjustable guide vanes are preferred at this time.

The transmission ratio is preferably selected in such a way that the forward speed of the vehicle is two to four time higher when the operator of the vehicle switches from the starting converter 41 to the cruising converter. This, combined with the feature that the cruising converter 51 comprises a discrete secondary shaft 55 which is coaxial with the secondary shaft 45 of the associated starting converter 41 and is operatively connected with the output shaft 11 by the gear train 26 and 27, insures that traction is satisfactory when the earthmoving vehicle is set in motion as well as when the bowl is to be filled with material. In other words, the just discussed presently preferred features of the converters 41 and 51 insure that the starting converter 41 is used only for moving the vehicle within a rather narrow range of low speeds at a very high starting torque and that the converter 51 is used for moving the vehicle within a much wider range of higher speeds. Moreover, the driver can decide to set the vehicle in motion by admitting fluid to the cruising converter 51.

The feature that the converters 41, 51 of the forward drive train comprise discrete secondary shafts 45, 55 distinguishes the improved transmission from the transmission which is disclosed in the aforementioned patent to Keller et al. The transmission of Keller et al. has a single secondary shaft for the starting and cruising converters of the forward drive train. Such an arrangement would not be entirely satisfactory in transmissions for earthmoving vehicles because the maximum performable hydraulic speed ratio between the converters (and thus the difference between the lower and higher velocity ranges) would be insufficient. Therefore, the forward drive train of the improved transmission comprises two hydraulically equivalent converters and a high mechanical reduction gear ratio (refer to the aforementioned ratio of 2.7:1) or two converters with a certain hydraulic speed ratio (1.8:1) and a relatively low mechanical reduction gear ratio (1.5:1). This could create certain problems (in the absence of the RPM monitoring device 82) because, when the vehicle speed would exceed the maximum cruising speed, the RPM of the turbine in the starting converter 41 would reach an undesirably high value; in fact, the parts of the converter 41 cold undergo excessive stresses and suffer serious damage as a result of exceptionally high centrifugal forces. The monitoring device 82 then allows fluid to escape from the working circuit of the cruising converter 51 (via valve 59a) and causes the valve 64a to admit fluid to the hydrodynamic brake 61. The monitoring device 82 may be any conventional device which is capable of establishing communication between the conduit 83 and control line 66 when the RPM of the shaft 80 reaches a predetermined value.

When the earthmoving vehicle is used to transport substantial quantities of rock, ore or the like through considerable distances and along roads which comprise steeply inclined portions, the transmission should be capable of furnishing substantial braking forces since the overall weight of a fully loaded earthmoving vehicle often equals or even exceeds 200 tons. The hydrodynamic brake 61 exhibits the advantage that it can be engaged as frequently as desired without any wear upon its parts. The vanes or blades of this brake are inclined in such a way that they are effective to furnish a pronounced braking action only while the vehicle moves in the forward direction. As mentioned above, the rotor (blades 62) of the brake 61 is mounted on the secondary shaft 35 of the starting converter of the reverse drive train. It has been found that, as a rule, an earthmoving vehicle will travel along a strongly inclined portion of a road or path only when it moves in the forward direction. Therefore, it suffices to design the brake 61 in such a way that its blades are more effective or are effective only when the vehicle moves in the forward direction. In view of the just explained situation, the establishment of a rigid connection between the rotor of the hydrodynamic brake 61 and the secondary shaft 35 of the starting converter 31 of the rearward drive train appears to defeat the intended purpose. However, by selecting the inclination or orientation of blades of the brake 61 in such a way that the brake can furnish a satisfactory braking torque during forward movement of the vehicle, i.e., when the rotor of the brake is driven by the gear 28, the brake is effective to serve its intended purpose when the RPM of the shaft 80 reaches or exceeds the aforementioned maximum permissible value. Moreover, the feature that the brake 61 is coaxial with the starting converter 31 of the reverse drive renders it possible to place the hydrodynamic assemblies 31, 41, 51, 61 at the corners of an imaginary square with attendant reduction of the size of the transmission.

As mentioned above, the centrifugal RPM monitoring device 81 disconnects the cylinder and piston unit 71 for the adjusting ring 49 of the starting converter 41 from the source 72 of pressurized fluid when the speed of the output shaft 11 exceeds the rated speed that corresponds to 20–40 percent of the maximum speed. This causes a reduction of power transmission by the converter 41 by effecting an appropriate adjustment of the vanes 46. The advantages of such adjusting means will be readily appreciated by considering that, when an earthmoving vehicle is in the process of being loaded with material, the enormous traction forces tend to cause slippage of the driven wheels of the vehicle. This means that the speed of the wheels and of the output shaft 11 exceeds a preselected value. The adjusting means including the monitoring device 81 is then activated to reduce the transmission of power by the converter 41. Consequently, the wear upon the tires of the driven wheels is reduced because, if a slippage occurs, the slippage is short-lasting due to the provision of the monitoring device 81.

If desired, the transmission may be equipped with a similar or analogous safety device which is activated when the output of the aforementioned hydrostatic pump or pumps of the lifting mechanism of a scraper temporarily exceeds the maximum permissible value. The safety device then automatically reduces the output torque of the hydrodynamic transmission.

In accordance with a presently preferred embodiment of the invention, at least the starting converters 31 and 41 are constructed and assembled in such a way that the flow of working fluid through the turbine wheels 34 and 44 is centrifugal, that the flow of fluid through the annulus of adjustable guide vanes 36 and 46 is centripetal, and that the housings 37 and 47 of the starting converters are stationary. This is in contrast to the construction and mode of operation of converters in the transmissions of presently known earthmoving vehicles and apparatus which are used in the construction industry. In such conventional transmissions, the flow of fluid through the turbine wheel of the converter is centripetal and the converter comprises a rotary housing. This is considered necessary or desirable because the energy input of such converters decreases considerably at elevated speeds of the input shaft. The starting converters of the improved transmission exhibit the advantage that they can insure a very wide range of output shaft speeds in spite of the very high starting torque. Moreover, the stationary housings 37, 47 of the starting converters 31, 41 can be integrated in the casing 90 (FIG. 1) of the transmission. This contributes to lower cost of the transmission, especially since the axes of the primary shafts 33 and 43 can be placed very close to each other (especially when compared with the distance between primary shafts of converters having rotary housings). Moreover, and since the starting converter 41 is adjustable, it presents no problems to automatically reduce its output power (see the RPM monitoring device 81 and valve 78) when the RPM of the output shaft 11 exceeds a desired value.

An important advantage of the improved transmission is that the torque which is transmitted by the output shaft 11 can be varied while the speed of the input shaft 10 remains unchanged. This is achieved by the provision of two adjustable starting converters 31, 41. Such mode of operation is particularly desirable in earthmoving vehicles because the hydrostatic pump or pumps of the lifting mechanism for the scraper bowl should be capable of furnishing the required power under all foreseeable operating conditions; otherwise, the speed of the bowl would fluctuate (especially decrease) when the bowl encounters an increasing resistance to movement into or with the material which is to be removed and/or transported by such vehicles. In the improved transmission, the speed of the input shaft 10 is constant but the operator is always in a position to change the output torque with a high degree of accuracy by the simple expedient of adjusting the one or the other starting converter. Moreover, the operator can prevent eventual choking of the engine by reducing the output torque, for example, in the event of abrupt surges of power requirements of the aforementioned pump or pumps in the lifting mechanism for the bowl of a scraper. This can take place when the bowl is in the process of being loaded with earth, rock, ore or the like.

The improved transmission exhibits the aforediscussed advantages regardless of whether the output shaft 11 is rotated in forward or reverse because both drive trains of the transmission comprise adjustable starting converters. In addition, the transmission exhibits the advantage that a change in the direction of movement of the vehicle can be achieved by the simple expedient of admitting fluid into the working circuit of one converter simultaneously with evacuation of fluid from the working circuit of another converter, i.e., without any shocks and without any wear upon the component parts. Moreover, admission of fluid into the working circuit of a starting converter can begin while the vehicle is still in motion, i.e., the starting converter which is in the process of receiving fluid can act as a brake to effect gradual and shock-free termination of movement in the preceding direction. The improved transmission is believed to be the first hydrodynamic transmission which exhibits all advantages but does not share the drawbacks of conventional transmissions. Therefore, the versatility and maneuvrability of an earthmoving vehicle which embodies the novel transmission is superior to that of presently known earthmoving vehicles, the vehicle which embodies our transmission requires less maintenance and repair, and its manipulation is less tiresome to the operator because changes in speed and/or direction of movement can be effected without any shocks. In its simplest form, the improved transmission may comprise only two torque converters which are adjustable, one disposed in the forward and the other in the reverse drive train. Then the converters may be arranged coaxial with each other. However, the arrangement of the converters on separate axes which are parallel to each other is preferred.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a transmission, particularly in a transmission for vehicles, a combination comprising rotary input means; reversible rotary output means; forward and reverse drive trains each including an adjustable starting fluid flow converter, a first mechanical power train common to and connecting said converters with said input means and a second mechanical power train connecting said converters with said output means, said converters being closely adjacent to each other and each thereof comprising a rotary primary element and a rotary secondary element, said first power train comprising a first gear train connecting said primary elements to each other and said second power train comprising a second gear train connecting said secondary elements to each other, said forward drive train further including a cruising fluid flow converter coaxial with the starting converter of said forward drive train and having a discrete secondary element which is coaxial with the secondary element of the starting converter of said forward drive train, each of said converters comprising a working circuit which is rendered operative in response to admission of working fluid and ineffective in response to evacuation of working fluid; a third power train connecting the secondary element of said cruising converter with said output means; a hydrodynamic brake having an annulus of blades in such orientation that said brake is effective only when said output means is rotated in the forward direction, said brake being coaxial with the starting converter of said reverse drive train and further comprising a rotor which rotates with the secondary element of said last mentioned starting converter; means for actuating said brake when the RPM of said output means exceeds a predetermined value; and means for evacuating working fluid from said cruising converter, said actuating means comprising means for operating said evacuating means simultaneously with actuation of said brake when said output means is rotated by said cruising converter.

2. In a hydrodynamic transmission for a vehicle, a combination comprising rotary input means; reversible rotary output means; forward and reverse drive trains each including an adjustable starting fluid flow converter having a working circuit which receives working fluid to render the respective converter operative and from which fluid is evacuated to render the respective converter inoperative, said converters being closely adjacent to and coplanar with each other and each thereof comprising a rotary primary element and a rotary secondary element, said primary elements being parallel to each other and the secondary element of the converter of said forward drive train being hollow, said forward drive train further comprising a cruising fluid flow converter coaxial with the starting converter of said forward drive train and having a discrete secondary element which is coaxial with and extends through the secondary element of the starting converter of said forward drive train, said drive trains further including a first mechanical power train common to and connecting said starting converters with said input means and a second mechanical power train connecting said starting converters with said output means, said first power train comprising a first gear train connecting said primary elements with each other for rotation in the same direction and said second power train comprising a second gear train connecting the secondary elements of said starting converters with each other for rotation in opposite directions, said starting converters being disposed between said power trains and said first power train being disposed between said cruising converter and the starting converter of said forward drive train, the reduction gear ratio of said forward drive train in operative condition of the respective starting converter being 2-4 times the reduction gear ratio of said forward drive train in operative condition of said cruising converter; and a third power train connecting the secondary element of said cruising converter with said output means, said second power train being disposed between said starting converters and said third power train.

3. A combination as defined in claim 2, wherein said cruising converter comprises a working circuit which is rendered operative in response to admission of working fluid and ineffective in response to evacuation of working fluid, and further comprising a brake for braking said vehicle, means for actuating said brake when the RPM of said output means exceeds a predetermined value and means for evacuating working fluid from said cruising converter, said actuating means comprising means for operating said evacuating means simultaneously with actuation of said brake when said output means is rotated by said cruising converter.

4. A combination as defined in claim 3, wherein said brake is a hydrodynamic brake having an annulus of blades in such orientation that said brake is effective only when said output means is rotated in the forward direction.

5. A combination as defined in claim 4, further comprising a casing, said converters and said brake being disposed in the interior of said casing.

6. A combination as defined in claim 4, wherein said converters and said brake are disposed at the corners of an imaginary square.

7. A combination as defined in claim 2, further comprising means for adjusting the starting converter of said forward drive train in response to an increase of the RPM of said output means beyond a predetermined value that corresponds to a rated portion of the maximum speed of the vehicle.

8. A combination as defined in claim 7, wherein said starting converters are adjustable to increase or reduce their power transmission and said adjusting means comprises means for reducing the transmission of power by the starting converter of said forward drive train when the RPM of said output means exceeds said predetermined value.

9. A combination as defined in claim 3, wherein said starting converters comprise turbine wheels for centrifugal flow of working fluid therethrough.

10. A combination as defined in claim 9, wherein said starting converters further comprise adjustable guide vanes for centripetal flow of working fluid therethrough.

11. A combination as defined in claim 10, wherein said starting converters further comprise stationary housings.

* * * * *